United States Patent [19]

Bonino et al.

[11] Patent Number: 4,580,817

[45] Date of Patent: Apr. 8, 1986

[54] CONNECTION SYSTEM FOR CONNECTING FIRST AND SECOND ELEMENTS EACH HAVING A COMPRESSED AIR ORIFICE

[75] Inventors: Pierre Bonino, Annecy; Christian Dueret, Annecy le Vieux; Cyrille Mazzoleni, Rumilly, all of France

[73] Assignee: Compagnie Parisienne d'Outillage a Air Comprime, Bonneville, France

[21] Appl. No.: 607,044

[22] Filed: May 4, 1984

[30] Foreign Application Priority Data

May 4, 1983 [FR] France ................ 83 07407

[51] Int. Cl.[4] ............................. F16L 37/26
[52] U.S. Cl. ................. 285/325; 285/150; 285/305
[58] Field of Search ............ 285/325, 150, 305; 446/89, 227; 137/271

[56] References Cited

U.S. PATENT DOCUMENTS

| | | | |
|---|---|---|---|
| 2,357,755 | 9/1944 | Moll | 285/325 X |
| 2,472,363 | 6/1949 | Blackinton | 446/127 |
| 3,560,027 | 2/1971 | Graham | 285/150 |
| 3,934,605 | 1/1976 | Lecais | 285/325 X |
| 4,488,742 | 12/1984 | Schopper et al. | 285/325 |

Primary Examiner—Richard J. Scanlan, Jr.
Attorney, Agent, or Firm—Sughrue, Mion, Zinn, Macpeak, and Seas

[57] ABSTRACT

The connection system connects a block (1) to a plate (3), each of which has a compressed air orifice. The block has a slideway for receiving a square section projecting portion on the plate, e.g. by sliding in a direction F2. Strips (6) are then slid into the assembly along a perpendicular direction F1 to lock the assembly. This system enables blocks to be removed from fixed metal pipework (5) without having to loosen the pipework. Also, because of the square section of the projecting portion, the block can be slid onto the plate in any of four different orientations, which can help in placing operator controls or instruments in more convenient positions.

3 Claims, 25 Drawing Figures

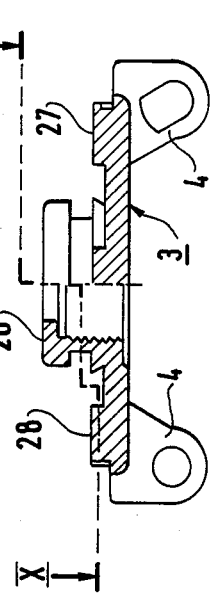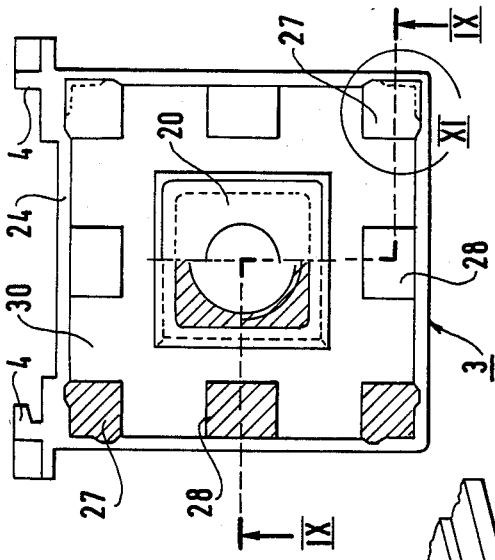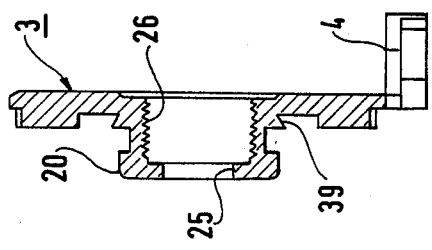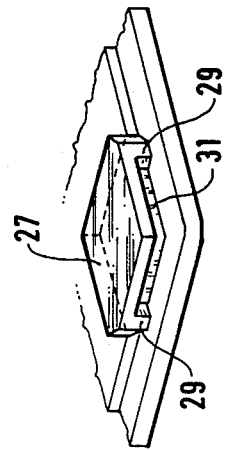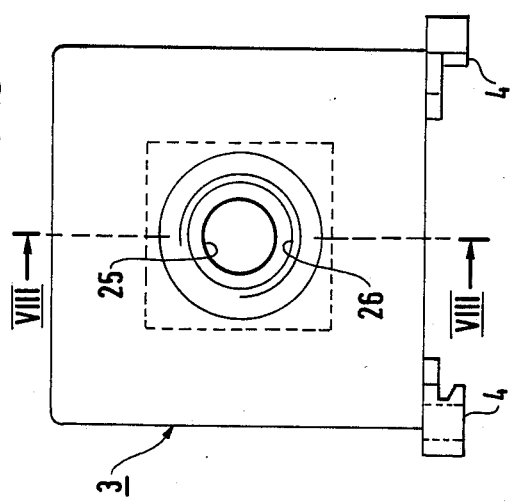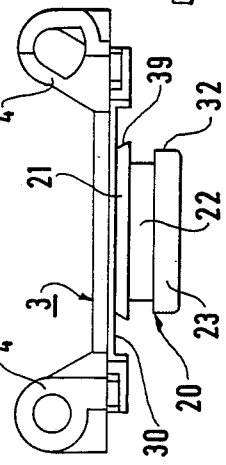

FIG.12A
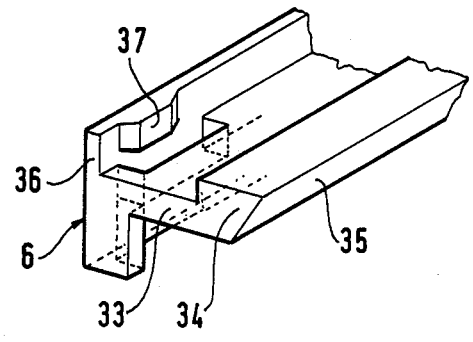
FIG.12B
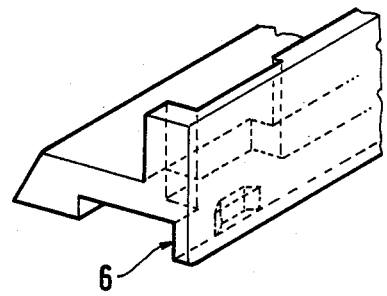
FIG.13    FIG.14    FIG.15
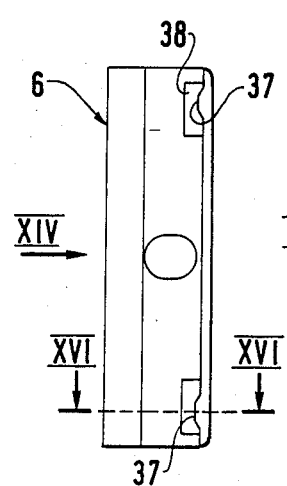 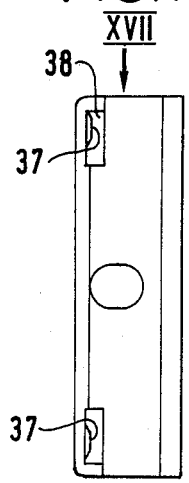 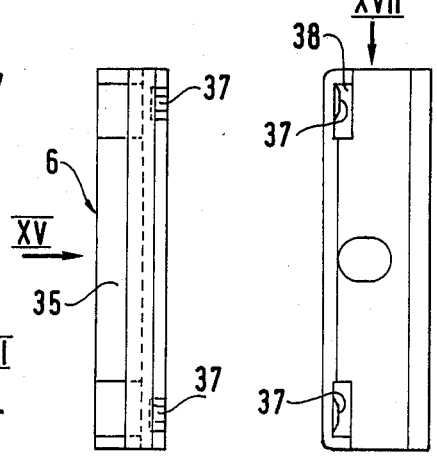
FIG.16
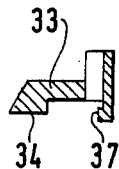
FIG.17
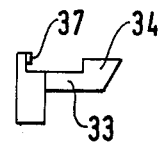

CONNECTION SYSTEM FOR CONNECTING FIRST AND SECOND ELEMENTS EACH HAVING A COMPRESSED AIR ORIFICE

The present invention relates to a connection system for connecting first and second elements each having a compressed air orifice.

BACKGROUND OF THE INVENTION

In known connection systems which use clamps fixed by nuts, it is difficult to change one of the elements since the pipework for compressed air which is made of metal and which is connected to the first and to the second elements do not readily let one clamp move away from the other. The metal pipework thus needs to be unscrewed in order to change an element.

Further, it is not possible to point one of the elements in any desired direction relative to the other in order to move a control member connected to the element being moved into a better position to be operated by an operator.

Preferred embodiments of the present invention make it possible to avoid these drawbacks.

SUMMARY OF THE INVENTION

The present invention provides a connection system for connecting a first element to a second element each of which is fitted with an orifice for compressed air, wherein the first element comprises a slideway having two parallel rails on either side of a slide path having the compressed air orifice at its center, the said rails being fitted with rims that overhang the said slideway and the second element comprises a face fitted at its center with a projecting portion having a square end and fitted with overhanging edges, the projecting portion having a bore opening out at an orifice at the end, the said projecting portion being insertable into the slideway along four perpendicular directions with opposite edges of the square end engaging under the rims of the slideway rails, the section of the slideway in a plane perpendicular thereto being complementary to the section in the same plane of the projecting portion as mounted in the slideway, and wherein the system includes locking means serving to lock the first element to the second element when the two orifices are opposite each other.

BRIEF DESCRIPTION OF THE DRAWINGS

An embodiment of the invention is described by way of example with reference to the accompanying drawings, in which:

FIG. 6 is a bottom view of the plate;

FIG. 7 is a side view of the plate;

FIG. 8 is a section on line VIII—VIII of FIG. 6;

FIG. 9 is a staggered section on line IX—IX of the plate shown in FIG. 10;

FIG. 10 is a bottom view of the FIG. 9 plate in section on staggered line X—X;

FIG. 11 shows a detail of FIG. 10;

FIGS. 12A and 12B are perspective views of opposite sides of a locking strip;

FIG. 13 is a plan view of the locking strip;

FIG. 14 is a profile view of the locking strip;

FIG. 15 is a bottom view of the locking strip;

FIG. 16 is a section on line XVI—XVI of FIG. 13;

FIG. 17 is and end view as seen along arrow XVII in FIG. 15;

MORE DETAILED DESCRIPTION

Figure 1:
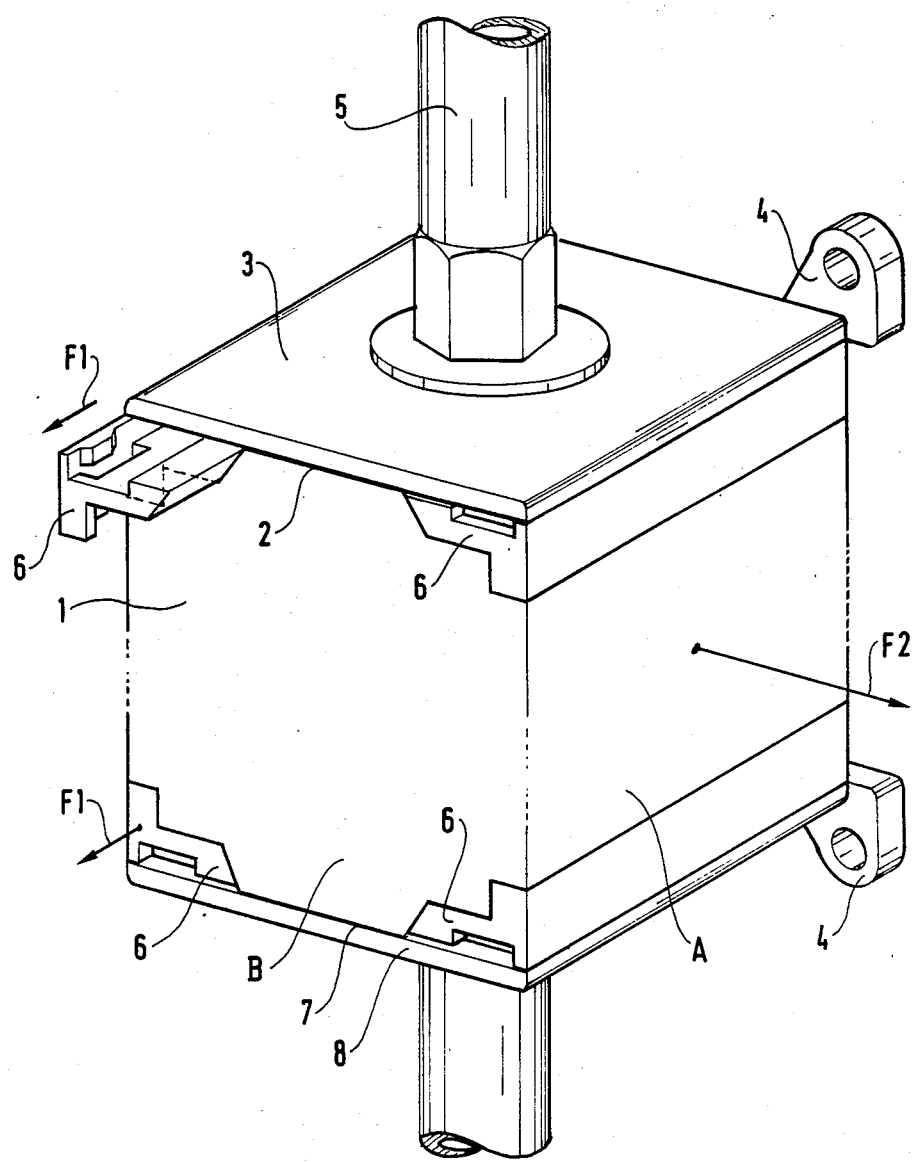
FIG. 1 is a perspective view of a connection system comprising a block and a plate which are assembled to each other.

FIG. 1 shows a cubic block 1 whose top face 2 is engaged in a plate 3 which is fixable via lugs 4 to a support. Metal pipework 5 for conveying compressed air is screwed to the plate 3. Two strips 6 lock the block 1 to the plate 3. To unlock the block, the strips 6 should be slid out in a horizontal direction F1 and then the block should be slid in a horizontal direction F2 perpendicular to the direction F1.

The block 1 has a bottom face 7 which is engaged on another plate 8 identical to the plate 3.

The side faces of the block 1 are provided with openings which are connected to pipework leading to compressed air devices, or else they are fitted with controls (not shown).

The inside of the block 1 is, of course, machined to enable it perform the desired functions.

The faces of the block 1 which are perpendicular to the direction F2 are labelled A and the faces perpendicular to the direction F1 are labelled B.

Figure 4:
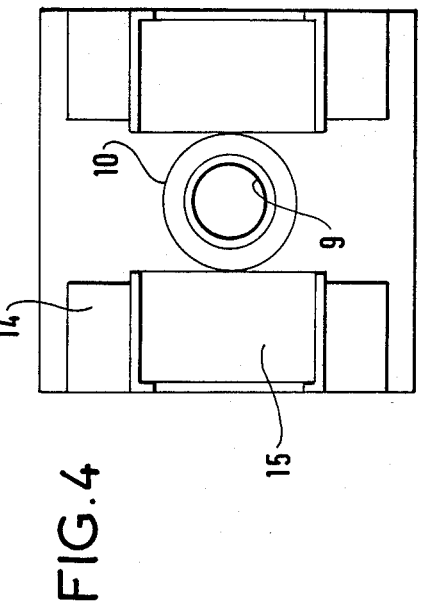
FIG. 4 is a plan view of the block.

The top face 2 of the block is shown in plan in FIG. 4 and has an orifice 9 disposed on the vertical axis of the block 1. The orifice 9 is surrounded by a groove 10 for receiving a sealing ring.

Figure 3:
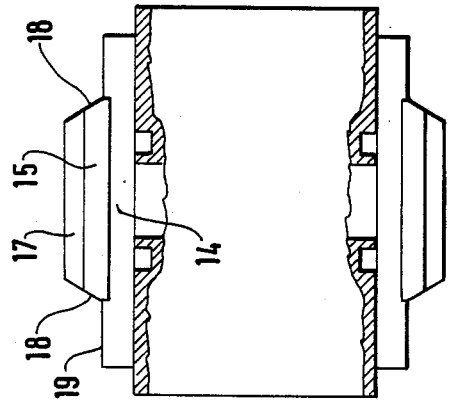
FIG. 3 is a partial section on line III—III of FIG. 2.
Figure 2:
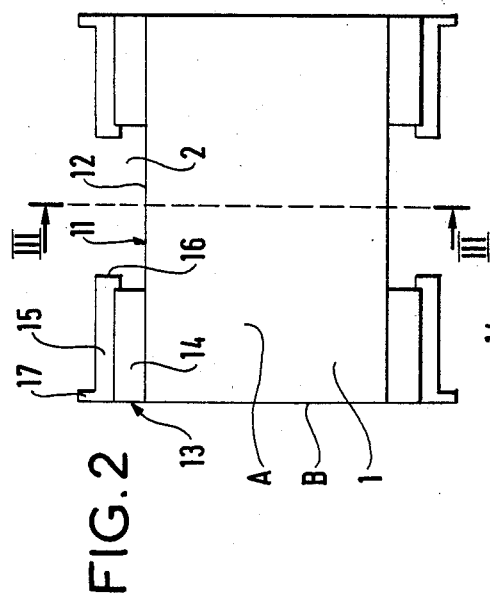
FIG. 2 is a front view of the block.

The face 2 has a slideway 11 comprising a slide path 12 delimited on either side by symmetrical rails 13. Each rail comprises a first parallelipiped shaped portion 14 with one face which extends one of the B faces of the block 1, and two end faces which are slightly set back from the A faces of the block 1 (see also FIG. 2 which is a side view looking at an A face of the block 1 and FIG. 3 which is a partial section on line III—III of FIG. 2).

Above the middle of each portion 14 there is a portion 15 in the form of a plate which has a rim 16 overhanging the slide path 12 and a flange 17 extending perpendicularly from its top face and in the extension of a B face of the block 1.

The sides of the block 15 are delimited by two slopes 18, leaving free two ends 19 of the top face of the portion 14.

FIG. 10 shows the plate 3, half as seen from above and half in section. The plate 3 has a portion 20 projecting from the middle of its bottom face 30 and symmetrical about both of the vertical planes which pass through the central axis and which are parallel to the A faces or to the B faces respectively. This portion 20 comprises a first portion 21 which is terminated by four inclined slopes 39 which flare away from the axis when moving away from the bottom 30 of the plate 3 (see FIG. 7 which is a side view of the plate 3).

A second portion 22 of square cross section is set back from the section 21 and is located between the section 21 and a square nose 23 of larger size whose edges 32 overhang the section 22.

The side faces of the section 22 are parallel to the sides of the plate 3.

The periphery of the lower face 30 is surrounded by a stepped back ledge 24.

In the middle of the projecting portion 20, there is a compressed air orifice 25 (see FIG. 6 which is a plan view of the plate, and also FIG. 8 which is a section on line VIII—VIII of FIG. 6). The orifice 25 is continued by a bore 26 of larger diameter and fitted with a screw thread in which the end of a length of pipework may be screwed.

Each of the corners of the bottom face 30 is provided with a projecting portion 27 of square section, and half way between two portions 27 there is a middle portion 28 of the same width as the side of the square of the portions 27 (see FIG. 9 which is a section through FIG. 10 on a line IX—IX). The portions 27 and 28 are the same height.

On their faces adjacent to the ledge 24, the portions 27 have a spur 29 followed by a gap 31 (see FIG. 11).

Figure 5:
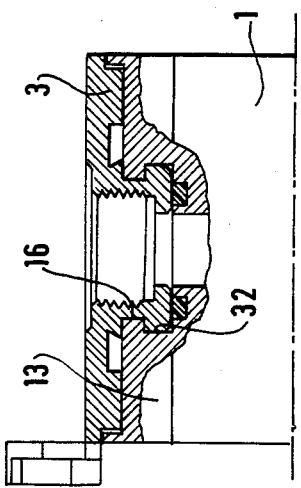
FIG. 5 is a partial section through an assembled block and plate.

To put the block 1 in place relative to the plate 3, the projecting portion 20 is engaged in slideway 11; rims 16 of the rails 13 are lodged close to the two opposite faces of the section 22 close to the edges 32 of the nose 23 (see FIG. 5 which is a section in a central vertical plane perpendicular to the B faces through the plate 3 and the block 1 when interconnected).

As can be seen in FIG. 5, the cross section of the slideway 11 is complementary to the section of the projecting portion which is received therein.

The vertical central axis is a four-fold axis of symmetry for the bottom face 30 of the plate 3 such that the block 1 can only applied thereto along four perpendicular directions.

When the projecting portion 20 is in the slideway 11 with the orifice 9 opposite to the orifice 25, the block 1 and the plate 3 can be held in position by means of two locking strips 6. Each strip (shown in parallel perspective views of each side in FIGS. 12A and 12B) comprises a horizontal leg 33 connecting a foot 34 having a sloping front face 35 to a vertical sill 36 having two studs 37. The leg 33 has two slots 38 level with the studs 37 to enable local deformation of the sill 35 (see FIGS. 13, 14, 15, and 17 which are a top view, a profile view, a bottom view, and an end view respectively of the strip 6, together with FIG. 16 which is a section on line XVI—XVI of FIG. 13).

Figure 18:
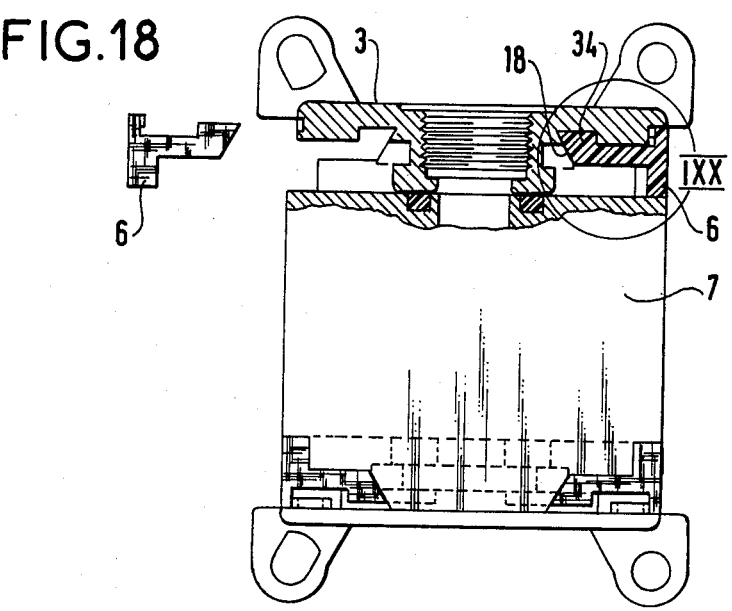
FIG. 18 is a partially cut away view of the block and the plate assembled by means of locking strips.

The strips 6 are slid into the spaces which remain free between the plate 3 and the block 1 and which are oriented perpendicularly to the slideway 11 (see FIG. 18).

Figure 19:
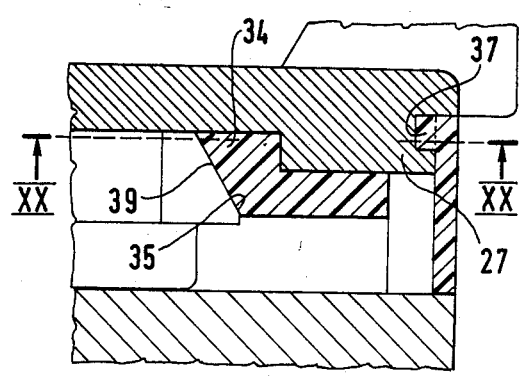
FIG. 19 is a section through a locking strip in position.

The foot 34 lodges in a space which is delimited by the sloping face 39 and the opposite flange 17 of the rail 13, and between the top face of the rail 13 and the inside face of the portions 27 and 28 (see FIG. 19).

Figure 20:
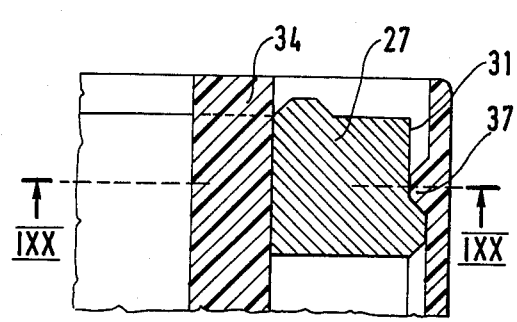
FIG. 20 is a section on line XX—XX of FIG. 19.

The studs 37 engage in the gaps, thus locking the strip 6 to block 1 and plate 13 (see FIG. 20). When two strips are in place, the block 1 and the plate 13 are held fast relative to each other.

Figure 21:
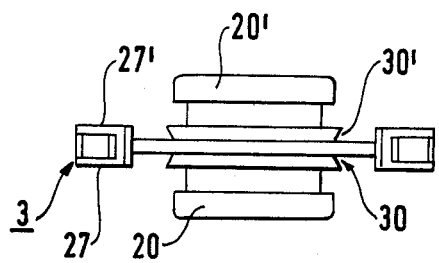
FIG. 21 is a side view of a two-way plate.
Figure 22:
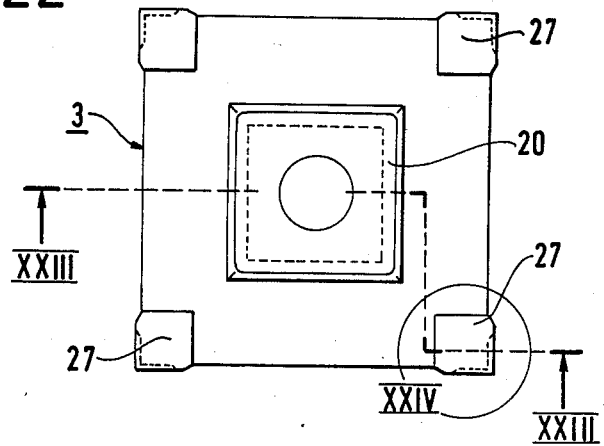
FIG. 22 is a plan view of the FIG. 21 plate.
Figure 23:
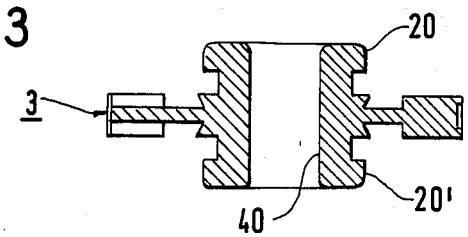
FIG. 23 is a section on line XXIII—XXIII of FIG. 22.
Figure 24:
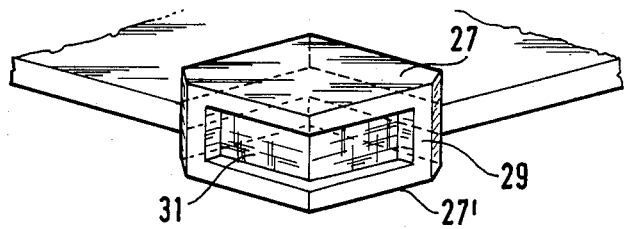
FIG. 24 is a perspective view of a corner of the both way plate.

A plate 3 having an upper face 30' which is symmetrical with its lower face 30 may be used to interconnect two blocks. (See FIGS. 21 and 22 which are a side view and a plan view respectively of this plate). The plate thus comprises a projecting portion 20, 20' on each of its faces, and each corner is fitted a square cross section portion 27, 27' fitted with respective spurs 29 followed by gaps 31 (see FIG. 24), and the plate is optionally fitted with intermediate portions (such a the volumes 28 in FIG. 8). The projecting portions have a channel 40 passing through them along their axis (see FIG. 23 which is a section on line XXIII—XXIII of FIG. 22).

We claim:

1. A connection system for connecting a first element to a second element each of which is fitted with an orifice for compressed air, wherein the first element comprises a slideway having two parallel rails on either side of a slide path having the compressed air orifice at its center, said rails being fitted with rims that overhang said slideway and the second element comprises a face fitted at its center with a projecting portion having a square end and fitted with overhanging edges, the projecting portion having a bore opening out at an orifice at the end, said projecting portion being insertable into the slideway along four perpendicular directions with opposite edges of the square end engaging under the rims of the slideway rails, the section of the slideway in a plane perpendicular thereto being complementary to the section in the same plane of the projecting portion as mounted in the slideway, wherein the system includes locking means serving to lock the first element to the second element when the two orifices are opposite each other, wherein said locking means comprises two locking strips, and said first and second elements define parallel spaces therebetween extending in a direction F1 which is perpendicular to the direction F2 of the slideway, said spaces being between said first element and said second element, each said first element and said second element having portions projecting into said spaces, and said locking strips having slots within corresponding faces thereof sized to and receiving said portions of said first and second elements projecting into the spaces, such that said locking strips interlock said first and second elements when they are inserted into respective spaces in a direction F1, such that their slots receive the portions projecting from said first and second elements into said spaces.

2. A connection system according to claim 1, wherein the strips are provided with studs which are received in gaps provided in one of the elements to lock the strips against movement in the direction F1.

3. A connection system according to claim 1, further comprising another first element, and wherein the second element is a plate having two projecting portions which are symmetrically disposed on either side of the plane of the plate, a channel passing through the projecting portions, and said second element is identically interconnected to said two first elements with said connection system comprised of two first elements connected to opposite sides of the second element via said two projecting portions of said plate.

* * * * *